US012684306B2

(12) United States Patent
Romblom et al.

(10) Patent No.: US 12,684,306 B2
(45) Date of Patent: Jul. 14, 2026

(54) DECORRELATING OBJECTS BASED ON ATTENTION

(71) Applicant: Apple Inc., Cupertino, CA (US)

(72) Inventors: David E. Romblom, Palo Alto, CA (US); Tomlinson Holman, Palm Springs, CA (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 18/434,506

(22) Filed: Feb. 6, 2024

(65) Prior Publication Data

US 2024/0259759 A1 Aug. 1, 2024

Related U.S. Application Data

(63) Continuation of application No. 18/546,263, filed as application No. PCT/US2022/016887 on Feb. 18, 2022, now abandoned.

(60) Provisional application No. 63/150,779, filed on Feb. 18, 2021.

(51) Int. Cl.
*H04S 7/00* (2006.01)

(52) U.S. Cl.
CPC .................................... *H04S 7/304* (2013.01)

(58) Field of Classification Search
CPC .. H04S 7/304; H04S 2400/11; H04S 2420/01; G06F 3/165
USPC .......................................................... 381/300
See application file for complete search history.

(56) References Cited

U.S. PATENT DOCUMENTS 5,222,059 A 6/1993 Holman
2019/0174246 A1 * 6/2019 De Bruijn ............... G06F 3/012
2020/0107122 A1 4/2020 Family et al.

OTHER PUBLICATIONS

Vinnikov et al., "Gaze-Contingent Auditory Displays for Improved Spatial Attention in Virtual Reality", received from https://percept.eecs.yorku.ca/papers/vinnikov_auditory.pdf, Apr. 2017, 38 pages.
PCT/US2022/016887, "PCT Notification of Transmittal of the International Search report and the Written Opinion of the International Searching Authority, or the Declaration", mailed May 30, 2022, 12 pages.

* cited by examiner

*Primary Examiner* — Paul Kim
(74) *Attorney, Agent, or Firm* — Aikin & Gallant, LLP

(57) ABSTRACT

A method includes determining a measure of a user's attention to a sound source in a spatial audio environment. Based on the measure of the user's attention to the sound source, one or more filters for decorrelating the sound source are determined. The sound source is spatially rendered, including applying the one or more filters to the sound source.

20 Claims, 6 Drawing Sheets

DECORRELATING OBJECTS BASED ON ATTENTION

CROSS-REFERENCE TO RELATED APPLICATION

This patent application is a continuation of U.S. patent application Ser. No. 18/546,263, filed Aug. 11, 2023, which is a U.S. National Phase Application under 35 U.S.C. § 371 of International Application No. PCT/US2022/016887, filed Feb. 18, 2022, entitled DECORRELATING OBJECTS BASED ON ATTENTION, which claims the benefit of U.S. Provisional Patent Application No. 63/150,779 filed Feb. 18, 2021, each of which is incorporated by reference herein in their entirety.

FIELD

One aspect of the disclosure relates to decorrelating audio objects based on attention. The audio objects can be rendered for spatial audio reproduction.

BACKGROUND

Humans can estimate the location of a sound by analyzing the sounds at their two ears. This is known as binaural hearing and the human auditory system can estimate directions of sound using the way sound diffracts around the head, reflects off of our bodies, and interacts with our pinna. These spatial cues can be artificially generated using spatial filters.

Audio can be rendered for playback with spatial filters so that the audio is perceived to have spatial qualities, for example, originating from a location above, below, or to a side of a listener. The spatial filters can artificially impart spatial cues into the audio that resemble the diffractions, delays, and reflections that are naturally caused by our body geometry and pinna. The spatially filtered audio can be produced by a spatial audio reproduction system (a renderer) and output through headphones.

Computer systems, including mobile devices, or other electronic systems, can run one or more applications that play audio to a user. For example, a computer can launch a movie player application that, during runtime, plays sounds from the movie to the user. Other applications, such as video calls, phone calls, alarms, games, and more, can have one or more sound sources. The sounds can be rendered spatially in a spatial audio environment.

SUMMARY

A computing device can visually represent sound sources to a user through a display such as a computer monitor, a touch screen of a computing device, a head mounted display, or other display technology. When a sound source is not the subject of a user's attention, for example, the sound source leaves the user's field of view, such sound sources can be spatially rendered in a manner that is less distracting to a user. Instead of merely altering such a sound with a low pass filter or a level reduction (e.g., volume control), the sound can be decorrelated so that it is perceived by a listener as being more spread out.

Sensors can track a user's head motion, gaze, hand gestures, or other input that indicates a user's attention to a sound source. Decorrelation filters can be determined that, when applied, cause a sound to be perceived as more spread out to a user, rather than having a concise point of origin. These filters can be applied to the sound source when the user is not paying attention to the sound source. A source that is subject to the user's attention can be spatially rendered with a concise point of origin. The decorrelation filters, and which sound sources that they are applied to, can be continuously updated based on the user's head position and/or the other inputs from which a measure of the user's attention is derived.

In some aspects of the present disclosure, a method is described for decorrelating sound based on the user's attention. A measure of a user's attention to a sound source is determined. Based on the measure of the user's attention, one or more filters are determined that decorrelate the sound source. The sound source is spatially rendered in a spatial audio environment, which includes applying the one or more filters to the sound source. In such a manner, sound sources that are not the subject of the user's attention can be less distracting to the user.

The spatial audio environment can include multiple sound sources. A sound source can be represented visually by an object, for example, an application window, an icon, a graphic, an avatar, a video, a person, an animal, or other visual object. A sound source that the user is deemed to be paying attention to can be spatially rendered with a concise source, while those that the user is not paying attention to are spread out via decorrelation algorithm. As the user's attention to different sound sources changes, the method and system can update the spatial rendering for each sound source accordingly, so that sound sources that are not the subject of the user's attention are decorrelated, but a sound source that is the subject of the user's attention is not decorrelated.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, algorithms, structures, and techniques have not been shown in detail so as not to obscure the understanding of this description.

Figure 1:
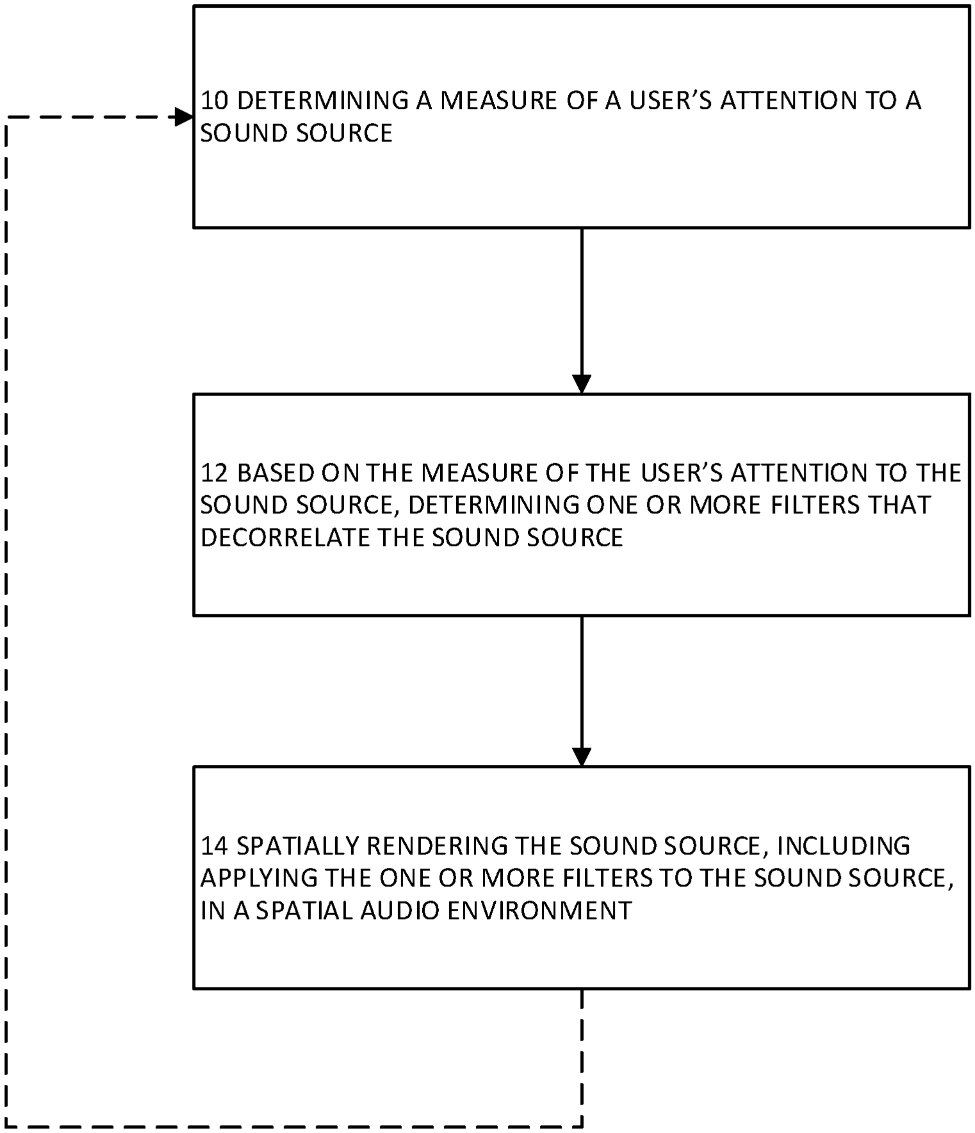
FIG. 1 shows a method for rendering spatial audio, according to some aspects.

FIG. 1 shows method for decorrelating one or more sound sources, according to some aspects. At operation 10, the method includes determining a measure of a user's attention to a sound source. One or more sound sources can have virtual locations in a spatial audio environment. They can be displayed in a visual environment, such as, for example, in 3D extended reality (XR) setting, or on a 2D display. The visual environment and the spatial audio environment can be temporally and spatially synchronized.

The measure of the user's attention can be determined based on different inputs, for example, one or more of: a head position of the user, eye tracking of the user, and interaction with the sound source by the user. For example, a direction of a user's head (elevation and/or azimuth) can be determined through sensors such as an inertial measurement unit (IMU), a camera (using visual odometry), and/or other equivalent technology. If the direction of the user's head is directed away from a sound source (e.g., the visual representation of the sound source in the visual environment), then the measure of the user's attention to that sound source can be determined to be low. If the direction of the user's head is directed at the sound source, then the measure of the user's attention can be determined as high. In some aspects, even if the direction of the user's head is directed away from the sound source, the sound source can be rendered as a concise image, based on a content-type or importance that is associated with the sound source. This can draw the user's attention towards the sound source.

In some aspects, a user's eye can be tracked with image sensors to determine gaze. For example, infrared eye tracking can be performed with infrared light that is directed at a user's eye. The light can create reflections that an image sensor and processor can use to keep track of pupil position. The position of the reflections relative to the pupil can be used to determined what the user is looking at (a so-called 'point of gaze'). Eye tracking algorithms (such as, for example, GazeCapture, or ScreenGlint) can use also natural or visible light to determine point of gaze. Eye tracking algorithms can include an artificial neural network (ANN) such as a convolutional neural network (CNN) to determine the point of gaze. Such algorithms can be implemented by a combination of hardware and software.

In some aspects, interaction with a sound source can be used to determine a measure of user attention to a sound source. User input such as hand gestures or other body movements can be captured by one or more sensors. In some aspects, a combination of sensors such as, for example, a camera, a depth sensor, a microphone array, and/or other sensors, can be used to sense a user's body and movements thereof. In some aspects, a user input device (e.g., a mouse, a handheld user input device) can be controlled by a user to select and manipulate a sound source or controls associated with the sound source. In some aspects, voice commands or user speech can be used to determine the measurement of user attention.

The measure of user attention can be quantified as one or more values. For example, it can be a normalized value from 0.0 to 1.0, 0 to 100, a binary 0 or 1, a set of values, or other convention that indicates the user's attention level to a sound source. Each input can contribute numerically to the measure of user's attention. In some aspects, the measure of user attention can be determined based on head direction. For example, as the user's head is directed towards a sound source, the measure of user attention increases, and as the user's head is directed away from the sound source, the measure of user attention decreases. The same can apply to a user's gaze.

In some aspects, the measure can include a plurality of values, each associated with an input. For example, the measure can include a first score that is based on the user's head direction (e.g., an azimuth, elevation), and/or a second score based on the tracked eye position of a user's eye, and/or a third that is a measure of interaction with the user. Different inputs can be weighted based on importance. Determining the measure of user attention can vary based on application.

At operation 12, the method includes determining one or more filters that decorrelate the sound source, based on the measure of the user's attention to the object. The one or more filters can include frequency dependent phase shifts in the frequency domain, and/or time delays associated with frequency sub-bands in the time domain.

For example, an audio channel can include signal that represents sound of the sound source. Spatial audio reproduction of the audio channel can be performed by applying spatial filters such as a head related transfer function (HRTF) or head related impulse response (HRIR) to the audio channel to generate a left and right audio channel. These audio channels can be used to drive left and right speakers of a headphone set to form a spatialized audio environment through what is known as binaural audio. Spatialized audio maintains the illusion that one or more sounds originate from virtual locations in the environment.

For frequency domain operations, an audio signal can be represented in the frequency domain by applying a Fourier transform such as, for example, a short time Fourier transform (STFT) or other known frequency domain transformation. Operations in the time domain can be performed by applying filters (e.g., a time domain filter bank) to an audio signal to emphasize signal components for particular frequency sub-bands. Spatial filters such as Head Related Impulse Responses (HRIRs) in the time domain, or Head Related Transfer Functions (HRTFs) in the frequency domain, can be applied to the resulting time domain or frequency domain audio signal to artificially create a spatial effect.

Spatial filters such as HRTF and HRIR can be determined based on a virtual location of a sound source and/or a head position. A head position can be determined as a location in space (e.g., X, Y, and Z coordinates) and/or a head direction (e.g., spherical coordinates such as azimuth and elevation). Decorrelation filters can include additional frequency dependent phase shifts such that, when applied to spatialized sound, spread or blur the sound so that the sound is perceived to be more ambient, having a less concise point of origin. The decorrelation filters can have different frequency dependent phase shifts for the left ear and the right ear. The shifts can be randomized between sub-bands (e.g., from one sub-band to another). The size of the phase shifts can be increased to increase the decorrelation effect.

At operation 14, the method includes spatially rendering the sound source, including applying the one or more filters (decorrelation filters) to the sound source, in a spatial audio environment. Application of the spatial filters (HRTFs and/or decorrelation filters) can be performed through convolution, for example, convolving an audio signal with a filter. If an audio environment includes multiple sound sources, then the spatialized sounds can be added together to form the audio environment.

Decorrelation filters can be applied as part of the HRTF/HRIR spatial filters, or as an addition. For example, an HRTF (determined based on sound source location and/or user head tracking) can be applied to an audio signal to spatialize the audio associated with the sound source. A decorrelation filter (having frequency dependent phase shifts) can be applied to the resulting signal to spread out the sound source in the spatial environment. Alternatively, the decorrelation filters can be applied as part of an HRTF. For example, decorrelation can be applied to an HRTF to apply frequency dependent phase shifts to the HRTF. In this case, when the HRTF is applied to the audio, this creates a spread out sound source rather than a concise sound source. Thus, decorrelation can be performed as an addition to an HRTF or as part of an HRTF.

In some aspects, the method can be repeated periodically to continuously update the spatial rendering of sound sources even as the user's attention shifts throughout a session. In such a manner, sound sources that are not the subject of the user's attention are decorrelated while a sound source that is the subject of the user's attention is rendered concisely.

Figure 2:
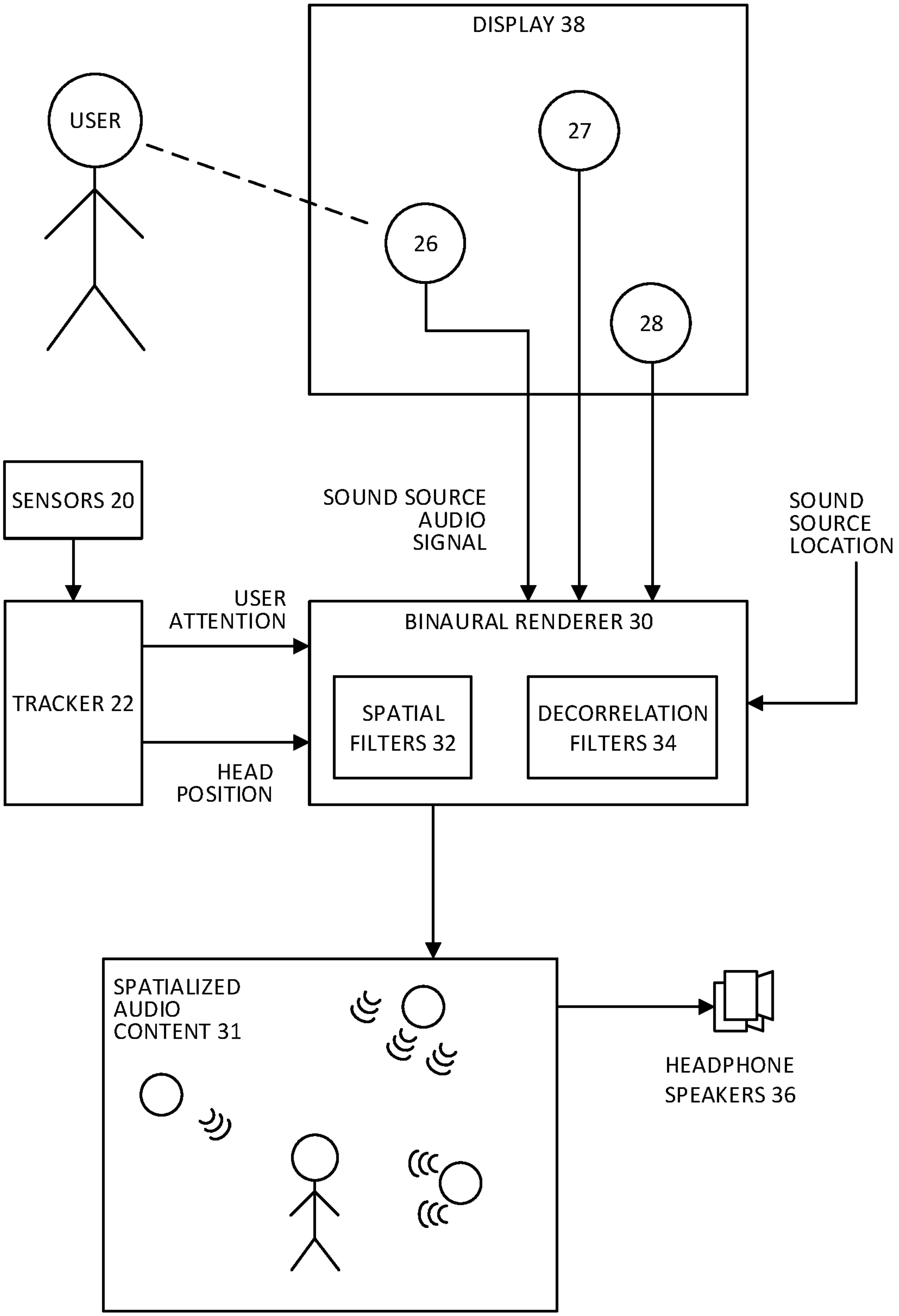
FIG. 2 shows a system for rendering spatial audio, according to some aspects.

FIG. 2 shows a system for rendering spatial audio, according to some aspects. A user can interact with visual representations of sound sources 26, 27, and 28, shown through a display 38. A sound source can be represented visually by an object, which can be, for example, an application window, a graphic, an avatar, an animation, an image, or other computer-rendered object. The user's attention can be determined based on inputs sensed by sensors 20 and tracking algorithms of tracker 22, as described in other sections.

In some aspects, sensors 20 can include one or more user input devices such as, for example, a mouse, a touch screen display, or a handheld controller. Attention to a sound source can be determined from interaction with the sound source, for example, by selecting an application, or interacting with an object that is associated with the sound source.

In some aspects, a microphone and speech or voice recognition algorithm can be used to determine a measure of user's attention to a sound source. For example, if a user specifies, though voice command, to launch an application, then the launched application can be rendered concisely (e.g., so that sound from the application is perceived to originate precisely from a visual representation of the application) while other applications are decorrelated. Similarly, in a virtual meeting with multiple participants, the user attention controller may determine, for example, based on voice activity, that the user is speaking with a particular participant, and thus decorrelate sound from other participants.

In some aspects, sensors can sense gestures from a user's hand or other body parts that can indicate which sound source the user is interacting with. This sound source can be deemed as the subject of the user's attention. As such, the other sound sources can be decorrelated.

The tracker can determine which application the user is currently paying attention to by determining a measure of user attention. The measure of user attention, as well as the user's head position, can be provided to binaural renderer 30. A binaural renderer 30 can spatially render one or more sound sources in the spatial environment by determining spatial filters 32 (e.g., HRTF or HRIR) that should be applied to audio signals of each sound source. The spatial filters can be determined as a function of each sound source location relative to the user's head position, e.g., with a look-up table or other known algorithm. Sound source location can be provided as metadata of the sound source. In some aspects, an operating system can access sound source location metadata, for example, if each sound source represents an application that is managed by the operating system. In other aspects, each sound source can belong to an application, for example, participants in a virtual meeting. Thus, the sound source locations may also be metadata that is managed by an application.

Binaural renderer 30 can apply spatial filters 32 to each of the audio signals corresponding to sound sources 26, 27, and 28. If the user turns her head towards sound source 26, tracker 22 can determine that the user's attention is being directed towards sound source 26. Suitable spatial filters are determined for each sound source based on the user's head position (which can include spherical coordinates such as azimuth and elevation, and/or a three-dimensional position such as X, Y, and Z) and corresponding sound source location. In such an example, decorrelation filters 34 can be applied to sound sources 27 and 28 in addition to (or as a modification to) the spatial filters 32, as described in other sections. Sound sources 27 and 28 can still have some spatial effect, such as originating from a general direction, but the point of origin will sound less concise than sound source 26. In such a manner, when a user pays attention to a sound source, the audio is rendered to originate from a concise point in space. When the user turns or looks away from the sound source, the audio will be rendered to sound more spread out, so as to be less distracting.

The binaural renderer 30 can generate spatialized audio for each audio source and combine them to form spatialized audio content 31. The spatialized audio acoustically resembles the locations of sound sources shown on display 38. For example, if sound source 26 is to the bottom right of the user's head as shown through the display, then the sound associated with sound source 26 is rendered so that it sounds like it is emanating from the sound source at the bottom right of the user's head. Thus, the visual environment shown on display 38 and the spatialized audio 31 are spatially and temporally synchronized.

The spatialized audio can be generated in the form of a left audio channel and a right audio channel, and used to drive speakers 36 of a headphone set. The speakers can be worn in-ear, on-ear, over-ear, or extra-aural. In some aspects, the speakers and/or display 38 can be integral to a head mounted display (HMD). The sound sources can be displayed in a three dimensional spatial environment (e.g., in an extended reality environment) or a two dimensional environment (e.g., a two-dimensional display).

FIGS. 3-6 show how decorrelation of sounds that are not the subject of the user's attention can be performed and controlled in different manners. Generally, in response to a decrease in the measure of the user's attention to the sound source, decorrelation of the sound source is increased. In response to an increase in the measure of the user's attention to the sound source, decorrelation of the sound source is decreased.

Figure 3:
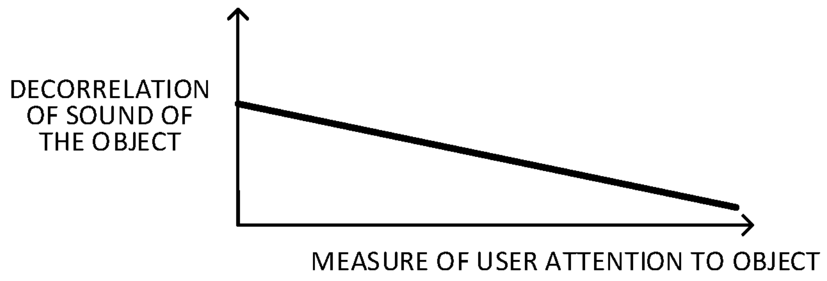
FIGS. 3-6 show examples of decorrelation control, according to some aspects.

For example, as shown in FIG. 3, the decorrelation of a sound source can be inversely proportional to the measure of the user attention. The relationship can be proportional or linear.

Figure 4:
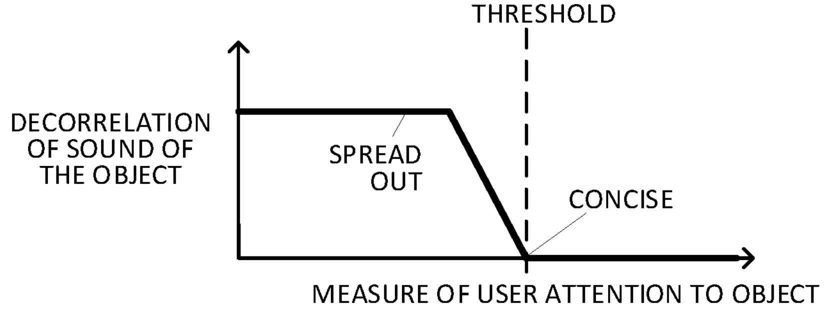

As shown in FIG. 4, if the measure of a user's attention satisfies a threshold, then the sound source is decorrelated, at least to a predetermined decorrelation level, where the sound is deemed to be sufficiently spread out. In some aspects, this decorrelation level can vary based on content type, recognizing that some content (e.g., speech) is more distracting than others (e.g., running water). Similarly, if the measure of a user's attention satisfies a second threshold (or no longer satisfies the previously mentioned threshold), thereby indicating that the measure of attention to an object is increased, then the decorrelation of the sound source can be reduced. In some aspects, decorrelation may be increased in response to the user's attention being below a threshold.

Figure 5:
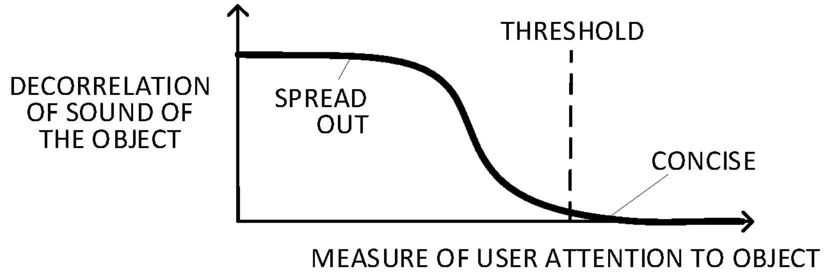

As shown in FIG. 5, the relationship between decorrelation of the sound source and the measure of user attention can be non-linear. Similar to the previous example, at some threshold, the decorrelation can increase sharply until the sound is sufficiently spread out.

Figure 6:
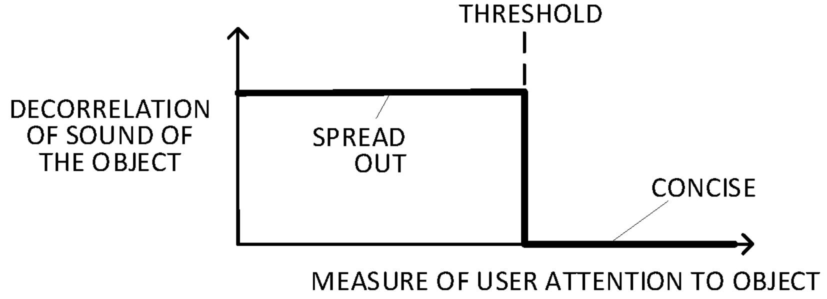

In another example, FIG. 6 shows a two-state relationship to decorrelation where if a measure of the user's attention satisfies a threshold then it is decorrelated. Otherwise, the sound is not decorrelated.

Decorrelation level can be controlled based on an amount or size of phase shift (or time delay) that is associated with different frequencies of the decorrelation filters. Thus, to increase decorrelation, the amount of phase shift (or time delay) can be increased. In the case where no decorrelation is applied, spatialization filters (e.g., HRTFs) are determined and applied without phase shift or time delay.

In some aspects, different control relationships can be applied for different sound sources. Different control relationships can be determined based on a type of the sound source. For example, for speech sound sources, an abrupt transition may be useful to quickly decorrelate one speech sound source in favor of another speech sound source (e.g., in a virtual meeting) because speech can be especially distracting.

Figure 7:
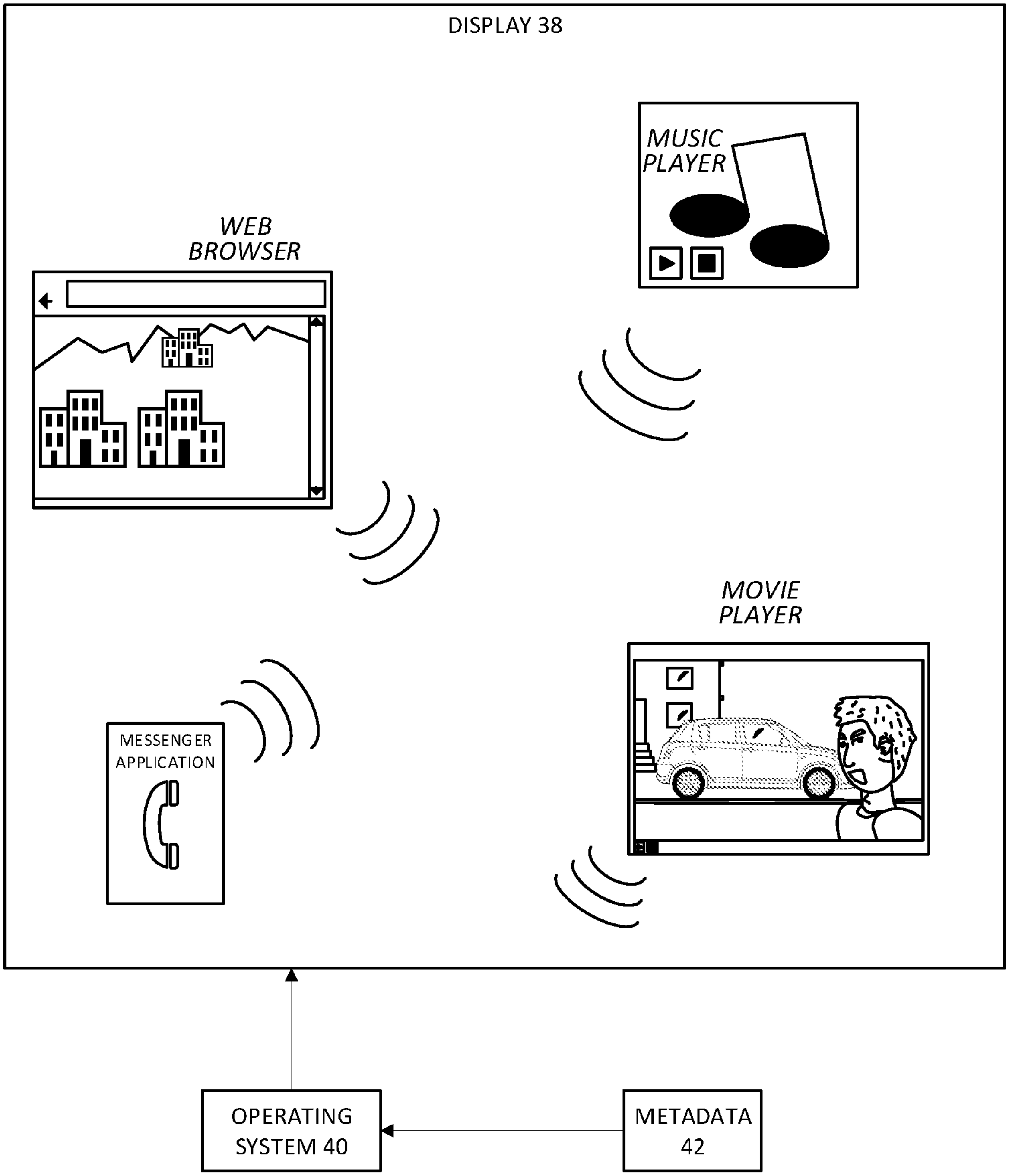
FIG. 7 shows an example of decorrelation of one or more sound sources, according to some aspects.

As shown in FIG. 7, in some aspects, different sound sources can each represent different applications, which can be managed by operating system 40. In some scenarios, an operating system can have multiple applications open, and thus, multiple audio streams may be 'active'.

An operating system 40 can manage applications that are shown to a user through the display 38. Each application can be represented visually by an object, such as, for example, an icon, a window, a picture, an animation, or other object. For example, a movie player application may play in a window that allows the user to view and control playback. The applications can be displayed as floating objects in a 2D or 3D virtual space. The operating system can have access to metadata 42, such as location of the application as displayed, loudness level of each application, or other information. The location information can be used to render each sound source spatially, as described in other sections.

Multiple applications can be open and shown simultaneously to a user. The user can look at and interact with the objects. In some aspects, the display 38 can be integral to a head mounted display (e.g., used in an extended reality (XR) setting) and each of the applications can be distributed in a 3D space of the XR setting. Measure of the user's attention can be determined and used as a basis to decorrelate sound sources. For example, if a user turns her gaze towards the movie player, then the other applications such as the web browser, the messenger application, and the music player can be decorrelated. In some aspects, for example, in an XR setting, some applications can be open but not shown to the user when those applications are outside the field of view of the user. Those applications, however, can still generate audio content that is presented to the user, and are also subject to being decorrelated based on user attention as described herein.

In some aspects, the decorrelation can be further determined based on criteria such as importance level, loudness level, a virtual distance, or content type. The criteria can be stored as metadata. For example, the importance level from some sound sources such as an alert from a messenger application may be deemed as high importance because such a sound source is associated with communication with the user, which may be of higher priority. Thus, even though another application might be subject to the user's attention, some sound sources, such as alerts, calls, alarms, system notifications, can be rendered spatially without decorrelation. Sound sources can have metadata that describe an importance of the sound source, loudness level, or a content type such as, for example, media, communication, system notification, game, and more.

Further, as described, user attention can be measured based on user interaction. For example, if a user manipulates a control (e.g., a dial or button) on the movie player, the measure of the user attention to the movie player can become high (indicating that it is the subject of the user's attention) even though the user's head and gaze may be directed elsewhere. Such an act can also be used to reduce the measure of user attention to other sound sources.

In some aspects, if loudness level of a sound source is below a threshold, then even if the measure of the user's attention is low, indicating that the sound source is not the subject of the user's attention, the sound source is not decorrelated, because the loudness level of the sound source low enough so as not to distract the user.

Figure 8:
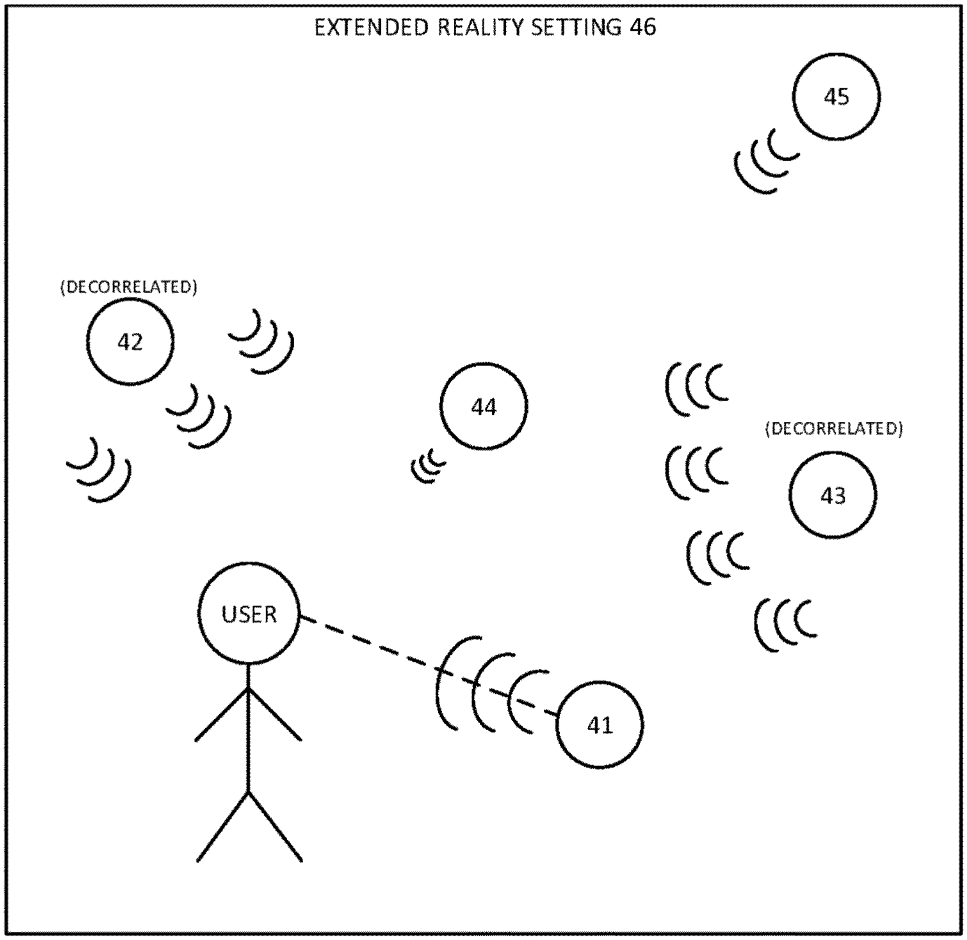
FIG. 8 illustrates an example of decorrelation of one or more sound sources with respect to a user, according to some aspects.

FIG. 8 illustrates an example of decorrelation of one or more sound sources in an extended reality setting 46, according to some aspects. A user can move about in the XR setting, such that the user's position, head position, and/or gaze in the XR setting can be tracked and updated by one or more sensors such as sensors 20 described with respect to FIG. 2. In some aspects, a user can use a handheld UID or other input device to interact with objects in the XR setting. Based on the measure of the user's attention to the sound sources, some sound sources can be decorrelated.

For example, the user can be turned towards and gazing at sound source 41 in the XR setting 46. Based on the tracked head position (e.g., azimuth, elevation) and/or gaze, the user attention is measured as high for sound source 41 and low for the other sound sources. In such a case, sound sources such as sound source 42 and sound source 43 can be spatially rendered with decorrelation, while sound source 41 can be spatially rendered concisely (without decorrelation). As described, however, other criteria such as loudness level, content-type, distance, or importance level, can be used to further determine whether or not an object will be decorrelated. For example, the loudness level of sound source 44 might be below a threshold so that the system need not decorrelate sound source 44, thus saving computational resources.

Figure 9:
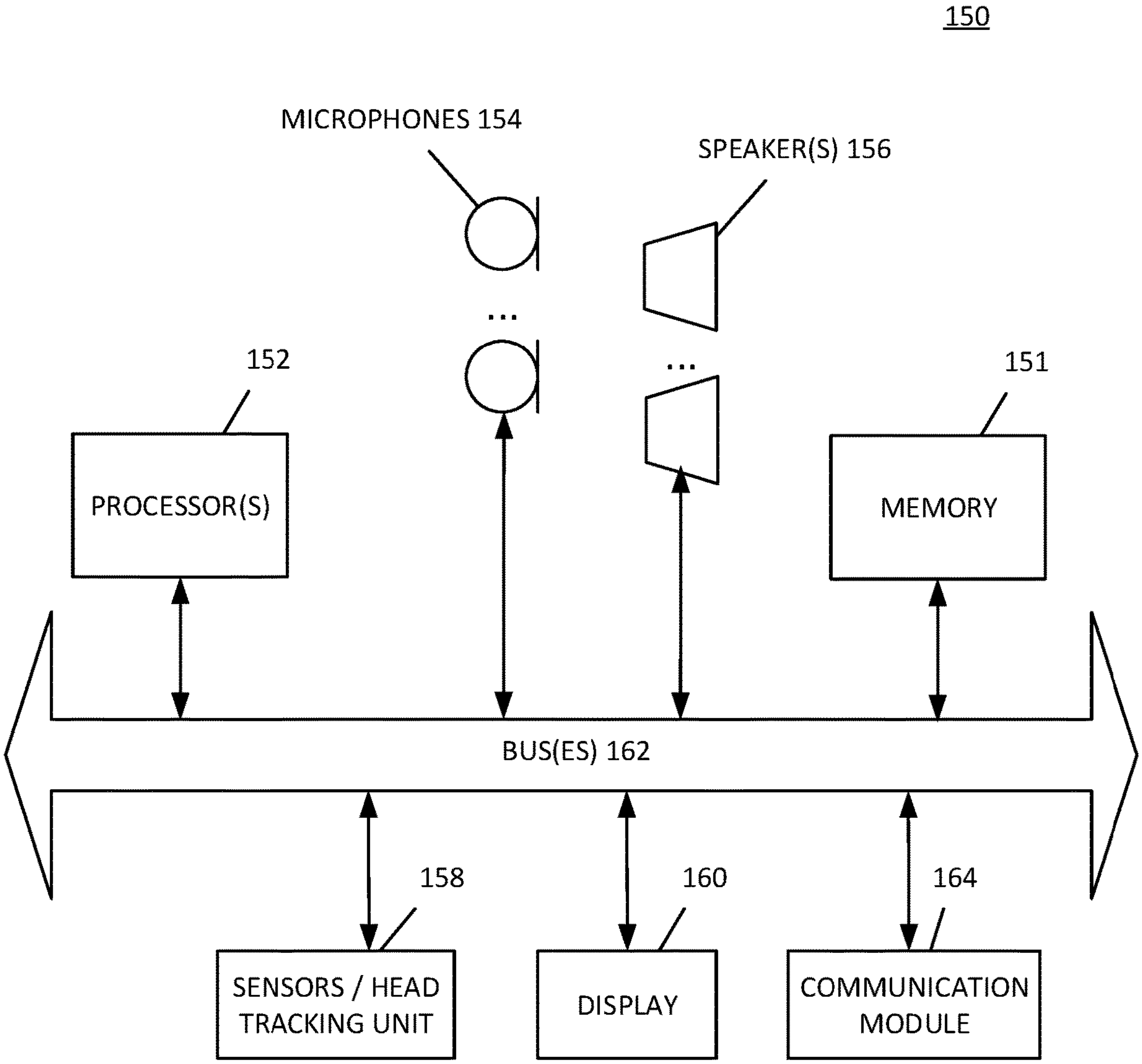
FIG. 9 shows an example of a computing device, according to some aspects.

In some aspects, distance (e.g., a virtual distance) is included as criteria for whether or not to decorrelate a sound source. In some aspects, if a sound source is outside of a distance threshold from the user, then the sound is not decorrelated. For example, if a virtual distance between the user and sound source 45 is beyond the distance threshold (e.g., 5 virtual meters, 8 virtual meters, or 10 virtual meters) then the spatialization of the sound source according to room acoustics may sufficiently decorrelate the sound. In such a case, performing decorrelation may be wasteful of computational resources FIG. 9 shows an example of an audio processing system 150 according to some aspects. The audio processing system can be a computing device such as, for example, a desktop computer, a tablet computer, a smart phone, a computer laptop, a smart speaker, a media player, a headphone, a head mounted display (HMD), smart glasses, an infotainment system for an automobile or other vehicle, or an electronic device for presenting XR. The system can be configured to perform the method and processes described in the present disclosure. In some aspects, systems such as those shown in FIG. 2 are implemented as one or more audio processing systems.

Although FIG. 9 illustrates the various components of an audio processing system that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated that other types of audio processing systems that have fewer or more components than shown can also be used. Accordingly, the processes described herein are not limited to use with the hardware and software shown.

The audio processing system 150 includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. Sensors/head tracking unit 158 can include an IMU and/or one or more cameras (e.g., RGB camera, RGBD camera, depth camera, etc.) or other sensors described herein, such as sensors 20 described with respect to FIG. 2. The audio processing system can further include a display 160 (e.g., an HMD, or touchscreen display).

Memory 151 can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "module", "processor", "unit", "renderer", "system", "device", "filter", "localizer", and "component", are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method for processing audio, comprising:

determining a measure of a user's attention to a sound source, determining one or more filters that decorrelate the sound source based on 1) the measure of the user's attention to the sound source and 2) content-type, importance, or loudness level that is associated with the sound source;

determining whether the sound source is within a threshold distance of a position of the user;

responsive to a determination that the sound source is beyond the threshold distance, spatially rendering the sound source, while omitting an application of the one or more filters; and responsive to a determination that the sound source is within the threshold distance, spatially rendering the sound source, including applying the one or more filters to the sound source.

2. The method of claim 1, wherein determining the one or more filters that decorrelate the sound source includes increasing decorrelation of the sound source in response to a decrease in the measure of the user's attention to the sound source.

3. The method of claim 1, wherein determining the one or more filters that decorrelate the sound source includes decreasing decorrelation of the sound source in response to an increase in the measure of the user's attention to the sound source.

4. The method of claim 1, wherein decorrelation of the sound source is increased when the measure of the user's attention to the sound source satisfies a threshold.

5. The method of claim 1, wherein the measure of the user's attention is determined based on one or more of: a head position of the user, eye tracking of the user, and interaction with the sound source by the user.

6. The method of claim 1, wherein the one or more filters include frequency dependent phase shifts or time delays.

7. The method of claim 1, wherein determining the one or more filters that decorrelate the sound source comprises:

determining a decorrelation function that indicates decorrelation of the sound source with respect to the measure of user's attention to the sound source, wherein the decorrelation function comprises a constant decorrelation level between at least a first measure threshold and a second measure threshold and a variable portion between at least the second measure threshold and a third measure threshold that is greater than the first measure threshold and the second measure threshold; and determining a decorrelation for the sound source from the decorrelation function that is associated with the measure of the user's attention.

8. The method of claim 7, wherein the constant decorrelation level is based on the content-type or the importance.

9. An electronic device, including a processor that is configured to perform an operation comprising:

determining a measure of a user's attention to a sound source, among a plurality of sound sources in a spatial audio environment, based on interaction with the sound source by the user, based on the measure of the user's attention to the sound source, determining one or more filters that decorrelate the sound source; and spatially rendering the sound source, including applying the one or more filters to the sound source, in the spatial audio environment.

10. The electronic device of claim 9, wherein determining the one or more filters that decorrelate the sound source includes increasing decorrelation of the sound source in response to a decrease in the measure of the user's attention to the sound source.

11. The electronic device of claim 9, wherein determining the one or more filters that decorrelate the sound source includes decreasing decorrelation of the sound source in response to an increase in the measure of the user's attention to the sound source.

12. The electronic device of claim 9, wherein decorrelation of the sound source is increased when the measure of the user's attention to the sound source satisfies a threshold.

13. The electronic device of claim 9, wherein the measure of the user's attention is further determined based on one or more of: a head position of the user or eye tracking of the user.

14. The electronic device of claim 9, wherein the one or more filters include frequency dependent phase shifts or time delays.

15. The electronic device of claim 9, wherein the electronic device includes at least one of: a computer, a tablet computer, a smart phone, a headphone set, or a head mounted display (HMD).

16. An article of manufacture that has a processor that is configured to perform the following:

determining a measure of a user's attention to a sound source, among a plurality of sound sources in a spatial audio environment;

determining one or more filters that decorrelate the sound source based on 1) the measure of the user's attention to the sound source and 2) content-type, importance, or loudness level that is associated with the sound source;

determining whether the sound source is within a threshold distance of a position of the user;

responsive to a determination that the sound source is beyond the threshold distance, spatially rendering the sound source, while omitting an application of the one or more filters; and responsive to a determination that the sound source is within the threshold distance, spatially rendering the sound source, including applying the one or more filters to the sound source, in the spatial audio environment.

17. The article of manufacture of claim 16, wherein determining the one or more filters that decorrelate the sound source includes increasing decorrelation of the sound source in response to a decrease in the measure of the user's attention to the sound source.

18. The article of manufacture of claim 16, wherein determining the one or more filters that decorrelate the sound source includes decreasing decorrelation of the sound source in response to an increase in the measure of the user's attention to the sound source.

19. The article of manufacture of claim 16, wherein decorrelation of the sound source is increased when the measure of the user's attention to the sound source satisfies a threshold.

20. The article of manufacture of claim 16, wherein the measure of the user's attention is determined based on one or more of: a head position of the user, eye tracking of the user, and interaction with the sound source by the user.

* * * * *